United States Patent
Cho et al.

(10) Patent No.: US 10,994,598 B2
(45) Date of Patent: May 4, 2021

(54) POWER TRANSMISSION APPARATUS FOR ELECTRIC VEHICLE

(71) Applicants: HYUNDAI MOTOR COMPANY, Seoul (KR); KIA MOTORS CORPORATION, Seoul (KR)

(72) Inventors: Wonmin Cho, Hwaseong-si (KR); Kijong Park, Hwaseong-si (KR); Seongwook Ji, Gunpo-si (KR); Juhyeon Park, Gyeongsangnam-do (KR); Ilhan Yoo, Hwaseong-si (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/592,946

(22) Filed: Oct. 4, 2019

(65) Prior Publication Data

US 2021/0016651 A1    Jan. 21, 2021

(30) Foreign Application Priority Data

Jul. 17, 2019  (KR) .................. 10-2019-0086094

(51) Int. Cl.
| | |
|---|---|
| *B60K 6/365* | (2007.10) |
| *B60K 6/50* | (2007.10) |
| *F16H 3/58* | (2006.01) |
| *B60K 6/48* | (2007.10) |
| *F16H 63/02* | (2006.01) |

(52) U.S. Cl.
CPC ............... *B60K 6/365* (2013.01); *B60K 6/50* (2013.01); *F16H 3/58* (2013.01); *B60K 2006/4808* (2013.01); *F16H 2063/025* (2013.01)

(58) Field of Classification Search
CPC .. B60K 6/365; B60K 6/50; B60K 2006/4808; F16H 3/58; F16H 2063/025
See application file for complete search history.

(56) References Cited

U.S. PATENT DOCUMENTS

| | | | | |
|---|---|---|---|---|
| 2,466,319 | A * | 4/1949 | Lawrence | .................. F16H 3/66 475/218 |
| 3,763,718 | A * | 10/1973 | Tipping | .................. F16H 47/04 475/82 |
| 2015/0031496 | A1* | 1/2015 | Hoffman | ............... F16H 37/042 475/280 |
| 2015/0141191 | A1* | 5/2015 | Zhang | ....................... F16H 3/54 475/151 |

FOREIGN PATENT DOCUMENTS

DE           102017109268 A1 * 10/2018  ............... B60K 6/36

* cited by examiner

*Primary Examiner* — Justin Holmes
(74) *Attorney, Agent, or Firm* — Brinks Gilson & Lione

(57) ABSTRACT

A power transmission apparatus for an electric vehicle having a motor as a power source may include: first and second input shafts coaxially disposed with a motor shaft of the motor and selectively connected to the motor shaft; an output shaft disposed in parallel with the first and second input shafts; and a planetary gear set disposed on the output shaft and including: a rotation element fixedly connected to the output shaft, and two rotation elements receiving torques from the first and second input shafts through respective external gear sets.

11 Claims, 3 Drawing Sheets

FIG. 2

| Shift-Speed | CL1 | CL2 | CL3 | Gear ratio |
|---|---|---|---|---|
| FD1(REV) | ● | ● | - | 4.160 |
| FD2 | - | ● | ● | 2.600 |
| FD3 | ● | - | ● | 1.625 |

# POWER TRANSMISSION APPARATUS FOR ELECTRIC VEHICLE

CROSS-REFERENCE TO RELATED APPLICATION

This application claims priority to and the benefit of Korean Patent Application No. 10-2019-0086094, filed on Jul. 17, 2019, the entire contents of which are incorporated herein by reference.

FIELD

The present disclosure relates to a power transmission apparatus for an electric vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to achieve environmental and fuel efficiency regulations.

In order to improve energy efficiency and driving convenience, various types of vehicles have been developed, such as an electric vehicle (EV) or a hybrid electric vehicle (HEV) that utilizes electrical energy, or a vehicle having a double clutch transmission (DCT).

The electric vehicle (EV) has been mass-produced mainly in light vehicles or small-sized passenger vehicles, but recently, as conventional internal combustion engine vehicles face strict regulations to promote environmental-friendly vehicles, large-sized passenger vehicles and sports utility vehicles (SUV) more implement electric vehicle (EV) mechanisms.

In order to cope with this trend, a multi-speed transmission is desired for large-sized and/or heavy vehicles to improve launch and/or slope-climbing performance (i.e., low speed performance) and maximum speed (i.e., high speed performance), and thus research and development for efficient transmission mechanism has been conducted to improve those performances and for better installation.

We have discovered that a typical multi-speed transmission for an internal combustion engine may have drawbacks that pinion gears included in the planetary gear set may rotate at an excessive speed when the motor speed becomes high, and thus an appropriate scheme of a multi-speed transmission for an electric vehicle is recommended.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for an electric vehicle having advantages of reduced number of parts to be compact in size thereby improving installability while realizing three shift-stages, by employing two power paths from a motor to a planetary gear through two external gear sets.

A power transmission apparatus for an electric vehicle according to an exemplary form may provide improved power delivery efficiency by suppressing relative speeds of pinion gears at a high speed of the motor by interconnecting a sun gear and a planet carrier with first and second input shafts through two external gear sets.

An exemplary power transmission apparatus for an electric vehicle having a motor as a power source includes: first and second input shafts coaxially disposed with a motor shaft of the motor and selectively connected to the motor shaft; an output shaft disposed in parallel with the first and second input shafts; and a planetary gear set disposed on the output shaft and including: first and second rotation elements receiving torques from the first and second input shafts through respective external gear sets, and a third rotation element fixedly connected to the output shaft.

The external gear sets may include a first external gear set and a second external gear set. The first external gear set may include a first externally-engaged drive gear and a first externally-engaged driven gear, the first being externally-engaged drive gear is fixedly connected to the first input shaft, and the first externally-engaged driven gear is externally gear-meshed with the first externally-engaged drive gear and fixedly connected to the first rotation element of the planetary gear set.

The second external gear set may include a second externally-engaged drive gear and a second externally-engaged driven gear. The second externally-engaged drive gear is fixedly connected to the second input shaft, the second externally-engaged driven gear is externally gear-meshed with the second externally-engaged drive gear and fixedly connected to the second rotation element of the planetary gear set.

The planetary gear set may be a single pinion planetary gear set.

The output shaft may be fixedly connected to an output gear externally gear-meshed with a final reduction gear of a differential.

The first input shaft may be formed as a hollow shaft, disposed coaxially with and external to the motor shaft without rotational interference, and selectively connected to the motor shaft. The second input shaft may be formed as a hollow shaft, disposed coaxially with and external to the motor shaft without rotational interference, and selectively connected to the motor shaft.

The first rotation element of the planetary gear set may be selectively connected to the third rotation element fixedly connected to the output shaft.

The first, second and third rotation elements of the planetary gear set respectively correspond to a sun gear, a planet carrier, and a ring gear. The sun gear of the planetary gear set may be fixedly connected to a first externally-engaged driven gear through a first connecting member and selectively connected to the ring gear. The planet carrier of the planetary gear set may be fixedly connected to a second externally-engaged driven gear through a second connecting member. The ring gear of the planetary gear set may be fixedly connected to the output shaft through a third connecting member.

The power transmission apparatus for an electric vehicle may further include a first clutch arranged between the motor shaft and the first input shaft, a second clutch arranged between the motor shaft and the second input shaft, and a third clutch disposed between the sun gear and the ring gear.

The first input shaft may be coaxially disposed with the motor shaft and selectively connected to the motor shaft. The second input shaft may be formed as a hollow shaft, coaxially disposed the first input shaft without rotational interference, and selectively connected to the motor shaft.

In another form, the first rotation element of the planetary gear set may be selectively connected to the output shaft.

The planetary gear set may include a sun gear, a planet carrier, and a ring gear. The sun gear may be fixedly connected to the first externally-engaged driven gear through a first connecting member and selectively connected to the output shaft. The planet carrier may be fixedly connected to a second externally-engaged driven gear through a second connecting member. The ring gear may be fixedly connected to the output shaft through a third connecting member.

The exemplary power transmission apparatus for an electric vehicle may further include a first clutch arranged between the motor shaft and the first input shaft, a second clutch arranged between the motor shaft and the second input shaft, and a third clutch disposed between the sun gear and the output shaft.

According to a power transmission apparatus for an electric vehicle of an exemplary form, the torque of the motor as a power source is selectively transmitted to a planetary gear set through first and second input shafts and two external gear sets, and then the planetary gear set outputs a shifted torque to an output shaft. Thus, number of parts is decreased enabling the transmission to be compact in size and to have a reduced length to improve installability, while realizing three shift-stages.

In addition, in a power transmission apparatus for an electric vehicle according to an exemplary form, power delivery efficiency may be improved by suppressing relative speeds of pinion gears at a high speed of the motor by interconnecting a sun gear and a planet carrier with first and second input shafts through two external gear sets.

Furthermore, according to a power transmission apparatus for an electric vehicle according to an exemplary form, three shift-stages are realized to provide improved launch and/or slope-climbing performance (low speed performance) and maximum speed (high speed performance).

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a shifting operational chart for a power transmission apparatus for an electric vehicle according to a first exemplary form of the present disclosure.

Figure 1:
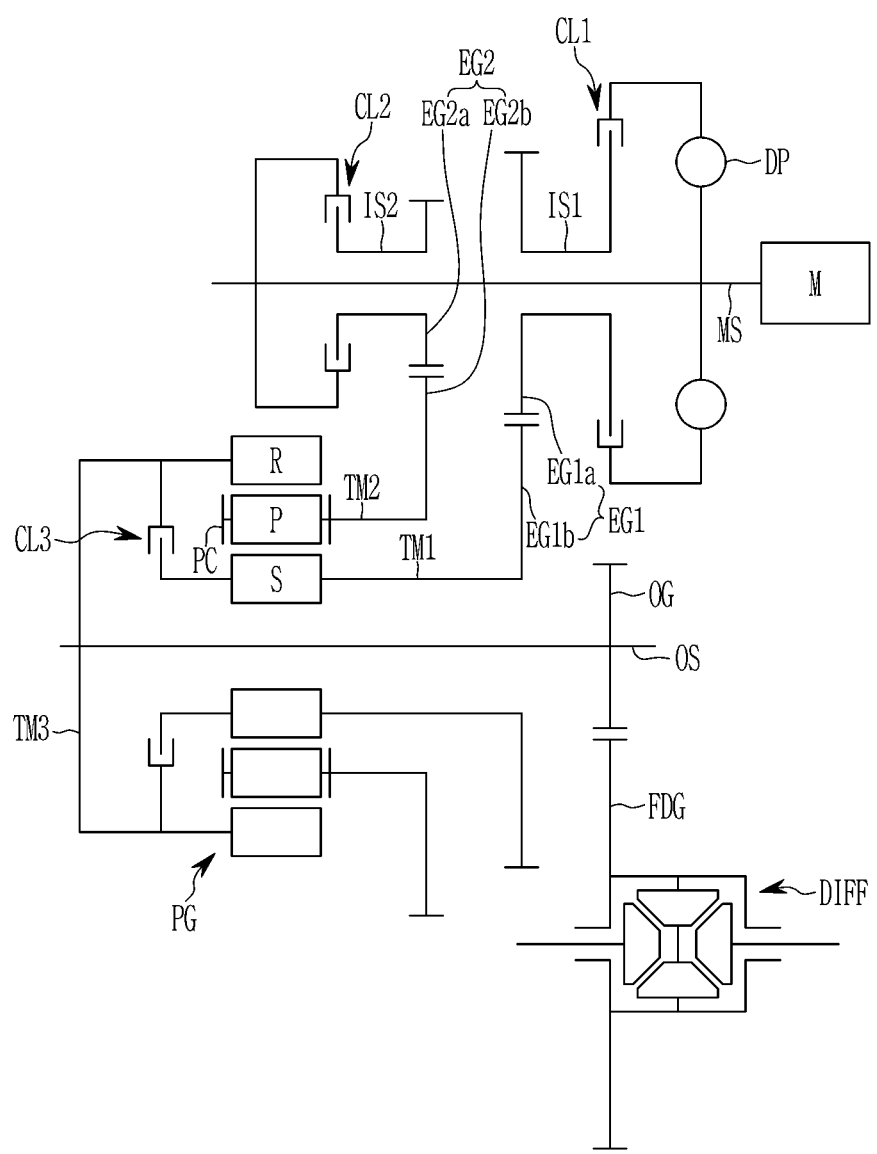
FIG. 1 is a schematic view of a power transmission apparatus for an electric vehicle according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In the following description, dividing names of components into first, second and the like is to divide the names because the names of the components are the same as each other and an order thereof is not particularly limited.

FIG. 1 is a schematic view of a power transmission apparatus for an electric vehicle according to a first exemplary form of the present disclosure.

Referring to FIG. 1, a power transmission apparatus for an electric vehicle shifts and outputs a torque of a motor M employed as a power source, and includes first and second input shafts IS1 and IS2, an output shaft OS, and a planetary gear set PG.

The motor M as the power source acts as a typical drive motor, and includes a stator fixed to a motor housing and a rotor connected to a motor shaft MS and rotatably supported within the stator.

The torque of the motor M is selectively transmitted to the first and second input shafts IS1 and IS2, changed at first and second external gear sets EG1 and EG2 respectively, and then input to the planetary gear set PG on the output shaft OS, where the input torque is cooperatively combined to form a shifted torque which is in turn outputted through the output shaft OS.

The first and second input shafts IS1 and IS2 are provided on the motor shaft MS at separate locations, and the output shaft OS is disposed in parallel with the first and second input shafts IS1 and IS2.

The first input shaft IS1 is formed as a hollow shaft, disposed coaxially with and external to the motor shaft MS without rotational interference, and selectively connected to the motor shaft MS, thereby selectively transmitting the torque of the motor M to the planetary gear set PG on the output shaft OS.

The second input shaft IS2 is formed as a hollow shaft, disposed coaxially with and external to the motor shaft MS without rotational interference, and selectively connected to the motor shaft MS, thereby selectively transmitting the torque of the motor M to the planetary gear set PG on the output shaft OS.

The output shaft OS is an output member, and is fixedly connected to an output gear OG to transmit the torque from the planetary gear set PG to the differential DIFF through the final reduction gear FDG externally gear-meshed with the output gear OG.

The planetary gear set PG is disposed on the output shaft OS receives torques from the first and second input shafts IS1 and IS2 and forms a shifted torque by cooperatively combining the received torques, thereby outputting the shifted torque to the output shaft OS.

The planetary gear set PG is a single pinion planetary gear set, and includes a sun gear S acting as a first rotation element, a planet carrier PC rotatably supporting a plurality of pinion gear P externally gear-meshed with the sun gear S, the planet carrier PC acting as a second rotation element, and a ring gear R internally gear-meshed with the plurality of pinion gear P engaged with the sun gear S, the ring gear R acting as a third rotation element.

The sun gear S is connected to the first input shaft IS1 through the first external gear set EG1, and the planet carrier PC is connected to the second input shaft IS2 through the second external gear set EG2. The ring gear R is fixedly connected to the output shaft OS.

The first external gear set EG1 includes a first externally-engaged drive gear EG1a and a first externally-engaged driven gear EG1b. The first externally-engaged drive gear EG1a is fixedly connected to the first input shaft IS1. The first externally-engaged driven gear EG1b is externally gear-meshed with the first externally-engaged drive gear EG1a and fixedly connected to the sun gear S of the planetary gear set PG through first connecting member TM1.

The second external gear set EG2 includes a second externally-engaged drive gear EG2a and a second externally-engaged driven gear EG2b. The second externally-engaged drive gear EG2a is fixedly connected to the second input shaft IS2. The second externally-engaged driven gear EG2b is externally gear-meshed with the second externally-engaged drive gear EG2a and fixedly connected to the planet carrier PC of the planetary gear set PG through the second connecting member TM2.

Gear ratios between externally-engaged drive and driven gears in the first and second external gear sets EG1 and EG2 may be appropriately set according to design condition of the transmission apparatus. In an exemplary form, the first external gear set EG1 is utilized for the forward third speed and the gear ratio EG1b/EG1a may be set as 1.625, and the second external gear set EG2 is utilized for the forward second speed and the gear ration EG2b/EG2a may be set as 2.600.

The ring gear R is fixedly connected to the output shaft OS through a third connecting member TM3.

In addition, the sun gear S of the planetary gear set PG is selectively connected to the ring gear R.

As a result, when the torque of the motor M is input to the sun gear S and the planet carrier PC through the first and second input shafts IS1 and IS2 and the first and second external gear sets EG1 and EG2, the planetary gear set PG forms a shifted torque by cooperatively combining the received toques and then outputs the shifted torque to the output shaft OS through the ring gear R.

In addition, when the sun gear S and the ring gear R of the planetary gear set PG are interconnected, the planetary gear set PG integrally rotates and a torque received from the first external gear set EG1 or second external gear set EG2 is merely output to the output shaft OS through the ring gear R.

In addition, according to an exemplary form, a plurality of clutches are employed to selectively connect corresponding pair of rotation members such as connecting members.

In detail, the clutches as the engagement elements includes first, second, and third clutches CL1, CL2, and CL3.

The first clutch CL1 is disposed between and selectively interconnects the motor shaft MS and the first input shaft IS1, and transmits the torque of the motor to the first input shaft IS1 when operated.

The second clutch CL2 is disposed between and selectively interconnects the motor shaft MS and the second input shaft IS2, and transmits the torque of the motor to the second input shaft IS2 when operated.

The third clutch CL3 is disposed between and selectively interconnects the first connecting member TM1 fixedly connected to the sun gear S and the third connecting member TM3 fixedly connected to the ring gear R, and enables the planetary gear set PG to integrally rotate when operated.

In addition, a damper DP is employed between the motor shaft MS of the motor M and the first clutch CL1 so as to absorb a potential shift shock.

The engagement elements of the first, second, and third clutches CL1, CL2, and CL3 may be realized as multi-plate hydraulic pressure friction devices that are frictionally engaged by hydraulic pressure, however, it should not be understood to be limited thereto, since various other configuration that are electrically controllable may be available.

FIG. 2 is a shifting operational chart for a power transmission apparatus for an electric vehicle according to a first exemplary form, to realize three shift-stages in an electric vehicle mode (EV mode), which is described in detailed below.

[EV Mode the Forward First Speed and Reverse Speed]

In the EV mode forward first speed FD1, as shown in FIG. 2, the first and second clutches CL1 and CL2 are operated.

As a result, the torque of the motor M at the motor shaft MS is transmitted to the first and second input shafts IS1 and IS2 by the operation of the first and second clutches CL1 and CL2, the torque of the first input shaft IS1 is changed at the first external gear set EG1 and input to the sun gear S of the planetary gear set PG, and the torque of the second input shaft IS2 is changed at the second external gear set EG2 and input to planet carrier PC of the planetary gear set PG.

Then, the torque is changed at the first and second external gear sets EG1 and EG2 by their gear ratios, and input to the sun gear S and the planet carrier PC of the planetary gear set PG. Then, the planetary gear set PG forms a shifted torque by a rotation speed difference between the sun gear S and the planet carrier PC, and outputs the shifted torque through the ring gear R to the output shaft OS, and the torque of the output shaft OS is transmitted to the differential DIFF through the output gear OG, thereby realizing the forward first speed.

That is, the forward first speed is realized by the gear ratios of the first and second external gear sets EG1 and EG2 and the ratio of the planetary gear set PG. It may be obviously understood that the reverse speed REV may be realized when the motor M as the power source is operated in an opposite rotating direction.

[EV Mode the Forward Second Speed]

In the EV mode forward second speed FD2, as shown in FIG. 2, the second and third clutches CL2 and CL3 are operated.

As a result, the torque of the motor M at the motor shaft MS is transmitted to the second input shaft IS2 by the operation of the second clutch CL2, and the torque of the second input shaft IS2 is changed at the second external gear set EG2 and input to planet carrier PC of the planetary gear set PG.

The planetary gear set PG integrally rotates since the sun gear S and the ring gear R are interconnected by the operation of the third clutch CL3, thereby outputting the input torque of the planet carrier PC to the output shaft OS, and the torque of the output shaft OS is transmitted to the differential DIFF through the output gear OG, thereby realizing the forward second speed.

The gear ratio of the second external gear set EG2 is used for realizing the forward second speed.

[EV Mode the Forward Third Speed]

In the EV mode forward third speed FD3, as shown in FIG. 2, the first and third clutches CL1 and CL3 are operated.

As a result, the torque of the motor M at the motor shaft MS is transmitted to the first input shaft IS1 by the operation of the first clutch CL1, and the torque of the first input shaft IS1 is changed at the first external gear set EG1 and input to sun gear S of the planetary gear set PG.

The planetary gear set PG integrally rotates since the sun gear S and the ring gear R are interconnected by the operation of the third clutch CL3, thereby outputting the input torque of the sun gear S to the output shaft OS, and the torque of the output shaft OS is transmitted to the differential DIFF through the output gear OG, thereby realizing the forward third speed.

The gear ratio of the first external gear set EG1 is used for realizing the forward third speed.

Figure 3:
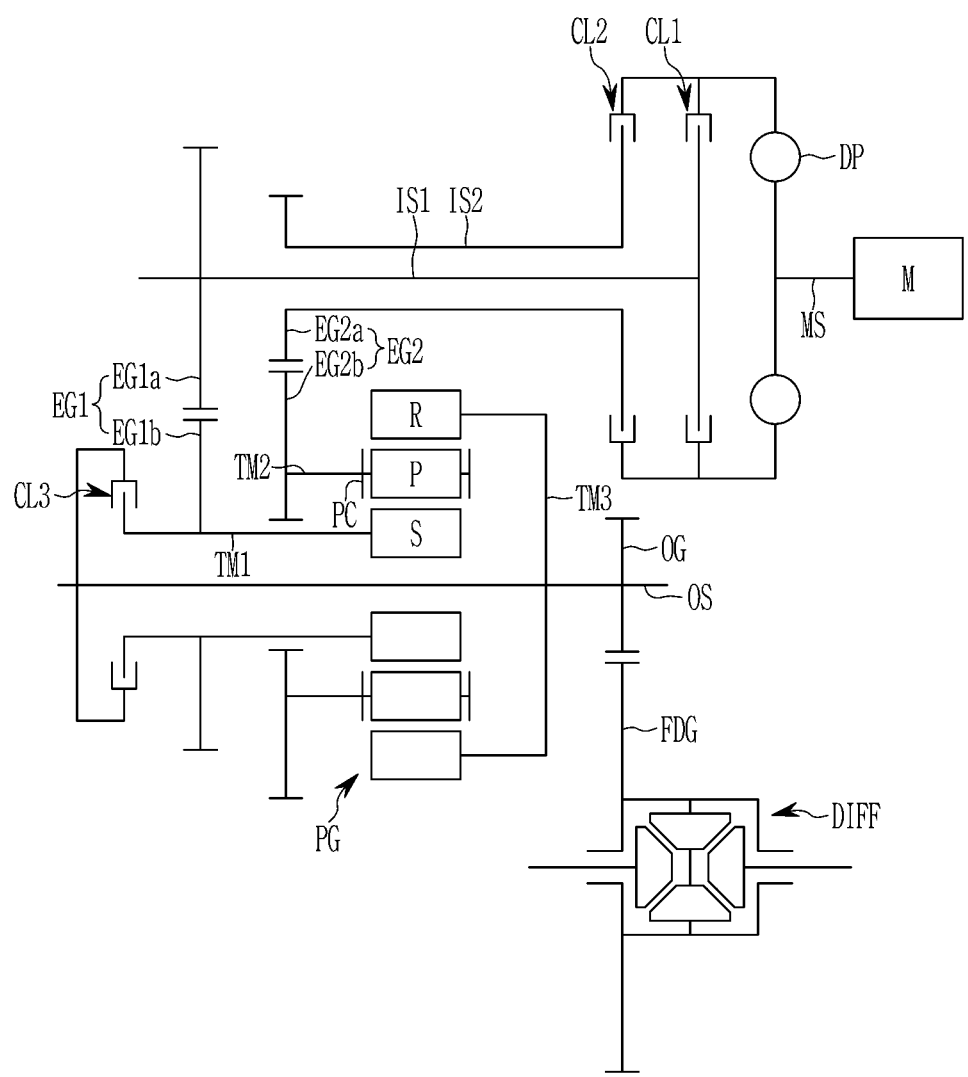
FIG. 3 is a schematic view of a power transmission apparatus for an electric vehicle according to a second exemplary form of the present disclosure.

FIG. 3 is a schematic view of a power transmission apparatus for an electric vehicle according to a second exemplary form of the present disclosure.

Referring to FIG. 3, the power transmission apparatus shifts the torque of the motor M, and includes first and second input shafts IS1 and IS2, an output shaft OS, and a planetary gear set PG, the same as in the first exemplary form.

Here, a power transmission apparatus according to the second exemplary form differs from the first exemplary form in that the first and second input shafts IS1 and IS2 are provided at axially different locations from the motor shaft MS, although they are still coaxial with the motor shaft MS.

The first input shaft IS1 is coaxially disposed with the motor shaft MS and selectively connected to the motor shaft MS, and the second input shaft IS2 is formed as a hollow shaft, disposed coaxial with and external to the first input shaft IS1 without rotational interference, and selectively connected to the motor shaft MS.

In addition, the first external gear set EG1 interconnecting the first input shaft IS1 and the sun gear S of the planetary gear set PG, and the second external gear set EG2 interconnecting the planet carrier PC and the second input shaft IS2 are disposed between the planetary gear set PG and the third clutch CL3, in comparison with the first exemplary form where the first and second external gear sets EG1 are disposed between the first and second clutches CL1 and CL2.

The third clutch CL3 is employed to enable the planetary gear set PG to integrally rotate, both in the first and second exemplary forms, although detailed interconnection may be different. In the first exemplary form where the third clutch CL3 is disposed between the first connecting member TM1 fixedly connected to the sun gear S and the third connecting member TM3 fixedly connected to the ring gear R. In comparison thereto, according to the second exemplary form, the third clutch CL3 is disposed between the first connecting member TM1 and the output shaft OS, where the first connecting member TM1 is fixedly connected to the sun gear S and the output shaft OS is fixedly connected to the ring gear R through the third connecting member TM3.

Although detailed interconnections are different between the first and second exemplary forms, functionality in the interconnections is the same as may obviously understood.

As described above, according to a power transmission apparatus for an electric vehicle according to exemplary forms, the torque of the motor M as a power source is selectively transmitted to the planetary gear set PG through first and second clutches CL1 and CL2, first and second input shafts IS1 and IS2, and first and second external gear sets EG1 and EG2, and then the planetary gear set PG outputs a shifted torque to the output shaft OS. Thus, number of parts is decreased enabling the transmission to be compact in size and to have a reduced length to improve installability, while realizing three shift-stages in the electric vehicle mode (EV mode).

In addition, in a power transmission apparatus for an electric vehicle according to an exemplary form, power delivery efficiency may be improved by suppressing relative speeds of pinion gears at a high speed of the motor by interconnecting a sun gear S and a planet carrier PC with first and second input shafts IS1 and IS2 through two external gear sets EG1 and EG2.

Furthermore, according to a power transmission apparatus for an electric vehicle according to an exemplary form, three shift-stages are realized to provide improved launch and/or slope-climbing performance (low speed performance) and maximum speed (high speed performance).

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

M: motor
CL1, CL2, CL3: first, second, and third clutches
IS1, IS2: first and second input shafts
MS: motor shaft
OG: output gear
OS: output shaft
EG1,EG2: first and second external gear sets
PG: planetary gear set
TM1, TM2, TM3: first, second, and third connecting members

What is claimed is:

1. A power transmission apparatus for an electric vehicle having a motor as a power source, the power transmission apparatus comprising:
   first and second input shafts coaxially disposed with a motor shaft of the motor and selectively connected to the motor shaft;
   an output shaft disposed in parallel with the first and second input shafts; and
   a planetary gear set disposed on the output shaft and including:
      first and second rotation elements receiving torques from the first and second input shafts through respective external gear sets; and
      a third rotation element fixedly connected to the output shaft,
   wherein:
      the first input shaft is formed as a hollow shaft, disposed coaxially with and external to the motor shaft without rotational interference, and selectively connected to the motor shaft; and
      the second input shaft is formed as a hollow shaft, disposed coaxially with and external to the motor shaft without rotational interference, and selectively connected to the motor shaft.

2. The power transmission apparatus of claim 1, wherein the external gear sets comprise:
- a first external gear set including a first externally-engaged drive gear and a first externally-engaged driven gear, wherein the first externally-engaged drive gear is fixedly connected to the first input shaft, and the first externally-engaged driven gear is externally gear-meshed with the first externally-engaged drive gear and fixedly connected to the first rotation element of the planetary gear set; and
- a second external gear set including a second externally-engaged drive gear and a second externally-engaged driven gear, wherein the second externally-engaged drive gear is fixedly connected to the second input shaft, the second externally-engaged driven gear is externally gear-meshed with the second externally-engaged drive gear and fixedly connected to the second rotation element of the planetary gear set.

3. The power transmission apparatus of claim 1, wherein the output shaft is fixedly connected to an output gear externally gear-meshed with a final reduction gear of a differential.

4. The power transmission apparatus of claim 1, wherein the first rotation element of the planetary gear set is selectively connected to the third rotation element.

5. The power transmission apparatus of claim 4, wherein:
- the first, second and third rotation elements of planetary gear set respectively correspond to a sun gear, a planet carrier, and a ring gear;
- the sun gear is fixedly connected to a first externally-engaged driven gear through a first connecting member and selectively connected to the ring gear;
- the planet carrier is fixedly connected to a second externally-engaged driven gear through a second connecting member; and
- the ring gear is fixedly connected to the output shaft through a third connecting member.

6. The power transmission apparatus of claim 5, further comprising:
- a first clutch arranged between the motor shaft and the first input shaft;
- a second clutch arranged between the motor shaft and the second input shaft; and
- a third clutch disposed between the sun gear and the ring gear.

7. A power transmission apparatus for an electric vehicle having a motor as a power source, the power transmission apparatus comprising:
- first and second input shafts coaxially disposed with a motor shaft of the motor and selectively connected to the motor shaft;
- an output shaft disposed in parallel with the first and second input shafts; and
- a planetary gear set having first, second, and third rotation elements and disposed on the output shaft, the first rotation element being externally gear-meshed with the first input shaft through a first external gear set, the second rotation element being externally gear-meshed with the second input shaft through a second external gear set, the third rotation element being fixedly connected to the output shaft and selectively connected to the first rotation element, wherein:
- the first input shaft is formed as a hollow shaft, disposed coaxially with and external to the motor shaft without rotational interference, and selectively connected to the motor shaft; and
- the second input shaft is formed as a hollow shaft, disposed coaxially with and external to the motor shaft without rotational interference, and selectively connected to the motor shaft.

8. The power transmission apparatus of claim 7, wherein:
- the first external gear set comprises a first externally-engaged drive gear and a first externally-engaged driven gear, the first externally-engaged drive gear being fixedly connected to the first input shaft, the first externally-engaged driven gear being externally gear-meshed with the first externally-engaged drive gear and fixedly connected to the first rotation element the planetary gear set; and
- the second external gear set comprises a second externally-engaged drive gear and a second externally-engaged driven gear, the second externally-engaged drive gear being fixedly connected to the second input shaft, the second externally-engaged driven gear being externally gear-meshed with the second externally-engaged drive gear and fixedly connected to the second rotation element the planetary gear set.

9. The power transmission apparatus of claim 8, wherein the planetary gear set is a single pinion planetary gear set having a sun gear as the first rotation element, a planet carrier as the second rotation element, and a ring gear as the third rotation element.

10. The power transmission apparatus of claim 7, wherein:
- the sun gear of the planetary gear set is fixedly connected to the first externally-engaged driven gear through a first connecting member and selectively connected to the ring gear;
- the planet carrier of the planetary gear set is fixedly connected to the second externally-engaged driven gear through a second connecting member; and
- the ring gear of the planetary gear set is fixedly connected to the output shaft through a third connecting member.

11. The power transmission apparatus of claim 10, further comprising:
- a first clutch arranged between the motor shaft and the first input shaft;
- a second clutch arranged between the motor shaft and the second input shaft; and
- a third clutch disposed between the sun gear and the ring gear.

* * * * *